United States Patent [19]

Kim

[11] Patent Number: 5,832,106
[45] Date of Patent: Nov. 3, 1998

[54] METHOD FOR CAMERA CALIBRATION OF RANGE IMAGING SYSTEM BY USE OF NEURAL NETWORK

[75] Inventor: Jae Han Kim, Daejeon, Rep. of Korea

[73] Assignees: Electronics and Telecommunications Research Institute, Daejeon; Korea Telecommunication Authority, Seoul, both of Rep. of Korea

[21] Appl. No.: 651,223

[22] Filed: May 22, 1996

[51] Int. Cl.[6] .............................. G06K 9/00; G06K 9/62
[52] U.S. Cl. ........................ 382/154; 382/156; 382/275
[58] Field of Search .................................... 382/156–157, 382/154–155, 153, 275, 285; 395/21, 23; 348/42–43, 207–208, 222; 345/419, 425, 427

[56] References Cited

PUBLICATIONS

"Geometric Camera Calibration Using Systems of Linear Equation" Keith D. Gremban, Charles E. Thorpe and Takeo Kanade, IEEE (1984).

"Camera Models Based on Data from Two Calibration", H.A. Martins, J.R. Birk, and R.B. Kelley, Revised Feb. 4, 1981, Computer Graphics and Image Processing 17, 173–180 (1981).

"Radiometric CCD Camera Calibration and Noise Estimation", Glenn E. Healey and Raghava Kondepudy, IEEE Transactions on Pattern Analysis and Machine Intelligence, vol. 16. No. 3, Mar. 1994.

Irwin Sobel, "On Calibrating Computer Controlled Cameras for Perceiving 3–D Scenes", 1974 by North–Holland Publishing Company, Artificial Intelligence 5, pp. 185–198.

H. A. Martins et al., "Camera Models Based on Data from Two Calibration", 1981 by Academic Press, Inc., Computer Graphics and Image Processing 17, pp. 173–180.

Roger Y. Tsai, "A Versatile Camera Calibration Technique for High–Accuracy 3D Machine Vision Metrology Using Off–the–Shelf TV Cameras and Lenses", 1987 IEEE, IEEE Journal of Robotics and Automation, vol. RA–3, No. 4, Aug. 1987, pp. 323–344.

*Primary Examiner*—Leo H. Boudreau
*Assistant Examiner*—Bhavesh Mehta
*Attorney, Agent, or Firm*—Jacobson, Price, Holman & Stern, PLLC

[57] ABSTRACT

A method and an apparatus for acquisition of calibrated three dimensional data from camera image. The apparatus for acquisition of calibrated three dimensional data from camera image includes a cameral, alight source and an image processing computer. The camera acquires a light strip image of a target object. The light illuminates light strip to the target object and provides information about the illumination angle form base line (or reference line). The image processing computer obtains image and information about the angle $\theta$ of light plane from base line; computes connection strength of neural network and acquires calibrated three dimensional data in neutral network based on the obtained information. The mapping relationship between a control point in the three-dimensional space and a control point projected onto the two-dimensional image plane and illumination angle of light source to control point are derived by the neural network circuit.

4 Claims, 4 Drawing Sheets

METHOD FOR CAMERA CALIBRATION OF RANGE IMAGING SYSTEM BY USE OF NEURAL NETWORK

BACKGROUND OF THE INVENTION

1. Field of the Invention

The present invention relates to a method for calibrating distortion of camera to obtain accurate three-dimensional(3-D) coordinate data in range imaging system.

2. Description of the Prior Art

The range imaging system based on optical triangulation is a sensor that commonly uses a camera and constructed light to gather three dimensional information for the purpose of an application to the three dimensional object recognition, robot vision system, non-contact inspection and medical diagnosis.

Since the image obtained from CCD or TV camera lost three-dimensional information in the projection of a three-dimensional scene onto a two dimensional image, a constructed light is required in order to get additional information and the triagulation processing is also required in order to determine the x-y-z position of a point from just it image position.

In addition, the image projected on image plane of camera is distorted due to imperfectness of camera such as lens distortion, scanning and acquisition timing error of electronic circuit. When the camera has inaccurate characteristics, its error ratio will cause an error of similar magnitude in the corresponding range values. As a result, there is a difficultly in the application.

Therefore it is needed camera calibration that is process of determining model parameters or a mapping relationship between locations of points in world coordinate and corresponding positions of the points on camera's image plane exactly. Since distortion due to imperfectness of camera has non-linear characteristics, it is not easy to determine model parameters or to get mapping relation mathematically.

For such a calibration, various methods have been used, wherein error components of an camera are calibrated, based on a distortion modeling obtained in accordance with the camera's construction or function.

For example, "Sobel" ("On calibrating computer controlled camera for perceiving 3D scenes", *Artificial Intelligence*, 5, pp. 185–198 (1974)) proposed a method for calibrating a camera by solving nonlinear equation to optimize eighteen parameters. "Martin" et al ("Camera models based on data from two calibration planes, *Computer Graphics and Image Processing*, 17, pp. 173–180 (1981)) proposed a two plane method by solving only linear equation without having any restriction on the extrinsic camera parameters. But nonlinear lens distortion cannot be corrected, accurate results on 3D measurement were not reported.

On the other hand, "Tsai" ("A versatile camera calibration technique for high accuracy 3D machine vision methodology using off-the shelf TV cameras and lense", *IEEE Journal of robotics and automation*, RA-3, No. 4, pp. 323–344. (August 1987)) proposed a distortion calibrating method using a four step transformation from 3D world coordinate to computer image coordinate in accordance with camera parameters including lenses.

In such conventional methods based on the mathematical modeling and analysis, however, full scale nonlinear search by computer is need or the characteristics of the camera being used should be known for the modeling. Moreover, the mathematical analysis is complex and requires a lot of time.

SUMMARY OF THE INVENTION

Therefore, an object of this invention is to solve the above-mentioned problems involved in the prior art and to provide coordinate mapping method using of neural network for range imaging system to calibrate non-linear distortion of projection due to imperfectness of camera.

For achievement of the object of the present invention, this novel method comprises the steps of:

(a) acquiring some mapping data between real exact x-y-z values of optional calibration points in the three dimensional world coordinate Pw[X-Y-Z] and u-v-θ values of corresponding points projected onto a two dimensional image plane Qi[U-v] while using an radiation angle 0 of light plane toward each calibration point from base (or reference) line as additional mapping information;

(b) finding strengths of the connection of a neural network from acquired mapping data that is training data (input data is u-v-θ values and desired target data is x-y-z values with relation to mapping) by many different algorithms, the most popular of which is the "back-propagation" method;

(c) storing the connection strengths in a table;

(d) back-projecting the image data u-v-θ values, which is obtained from the camera to obtain range data and indexed with corresponding radiation angle 0 of light plane from base line, by successively inputting u-v-θ values into input nodes of neural network and respectively gathering output x-y-z values at output nodes of neural network.

Differing from conventional analytic and modeling method for camera calibration, invented method has the advantage of being simple, accurate, and efficient.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
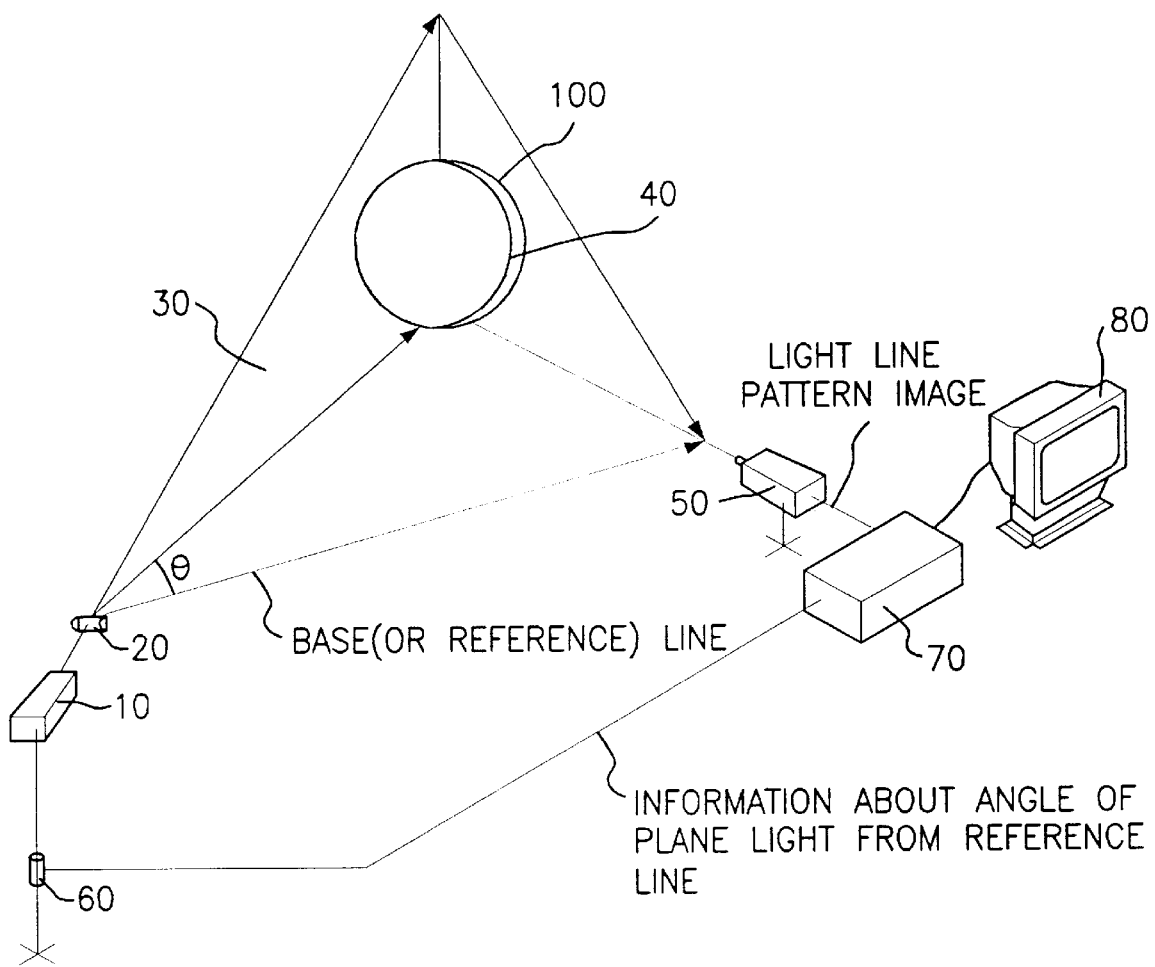
FIG. 1 is a view illustrating a hardware to which the present invention is applied.

FIG. 1 illustrates a hardware to which the present invention is applied.

When real image in the three dimensional world coordinate projected onto two dimensional image coordinate, it is impossible to derive such three dimensional information because information about one of the three dimensions is lost.

In accordance with the present invention, a light plane 30, which may be formed, for example, using a laser beam source 10 and half cylindrical lens 20, is actively illuminated onto an surface of object 100 in a three dimensional space, thereby forming a light stripe 40 at a position to be derived, as shown in FIG. 1.

An image indicative of the light stripe image is successively obtained by a camera 50. Based on the line pattern image acquired from superposition of light stripe image in accordance with rotating light plane, two equations for illuminated light plane and "line of sight" vector established upon back-projecting a point on a two dimensional image plane is derived. Using the derived equations, a three dimensional coordinate of the image is calculated in accordance with the triangulation method. In other words, when an illuminating angle of laser from base line and a corresponding line of sight vector upon back-projection are known, the range of a point on image plane can be derived by triangulation.

In FIG. 1, the reference numeral 60 denotes angle control unit of plane light, for example which is stepping motor, 70 is an image processing computer for obtaining information about the angle θ of light plane from base line and carrying out an image processing based on obtained information, and 80 is a monitor for outputting information about three dimensional range.

Figure 2:
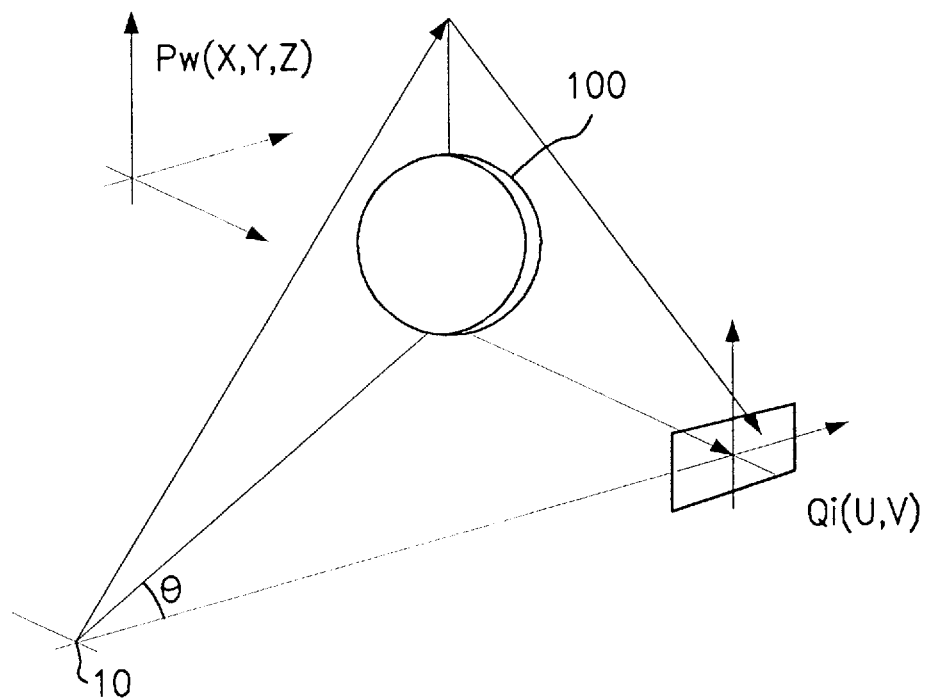
FIG. 2 is a view explaining the concept of a mapping coordinate system.

FIG. 2 is a view explaining the concept of a mapping coordinate system. In accordance with the camera calibration method of the present invention, distortion of projection onto image plane is corrected or reduced by process of exactly determining a mapping relationship between locations of points in world coordinate and corresponding positions of the points on camera's image plane using neural network.

In accordance with the method of present invention, mapping function between known x-y-z values of optional control point in the three dimensional world coordinate Pw[X-Y-Z] and u-v-θ values of corresponding points projected onto a two dimensional image plane Qi[U-V] while using an illumination angle θ of light plane toward each control point from base line as additional mapping information is obtained by learning neural network with above training data set about optional calibration points.

Figure 3:
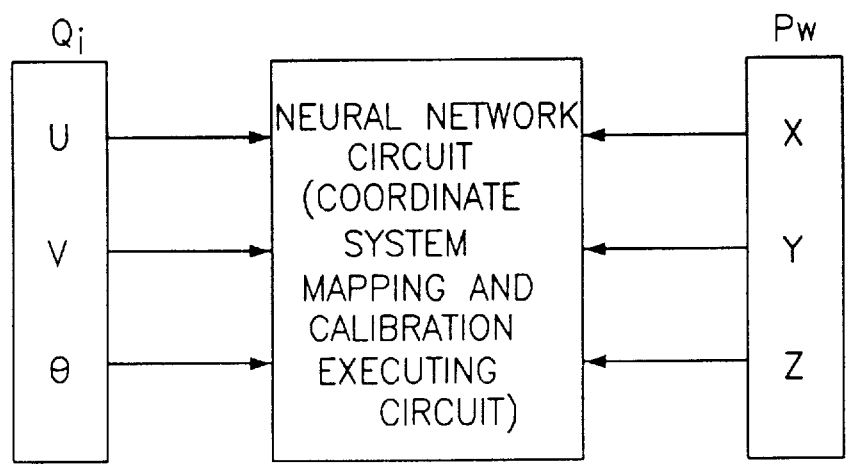
FIG. 3 is a view explaining the concept of the mapping method using a neural network in accordance with the present invention.

FIG. 3 is a view explaining the concept of the mapping method using a neural network in accordance with the present invention. The method of the present invention includes the procedure of deriving a mapping function to calibrate distortion of projection. The procedure of deriving the mapping will be described in conjunction with FIG. 3 and FIG. 4. As shown in FIG. 3, coordinate values u-v of points Qi on camera image plane respectively corresponding to the calibration points Pw and illumination angles θ of light plane are also assigned as input data Qi[U,V,θ] for input stage of neural network and x-y-z are also assigned as output data Pw[X-Y-Z]. By these data, a learning data set is constituted. Based on the learning data set, a learning is executed below predetermined error range.

Figure 4:
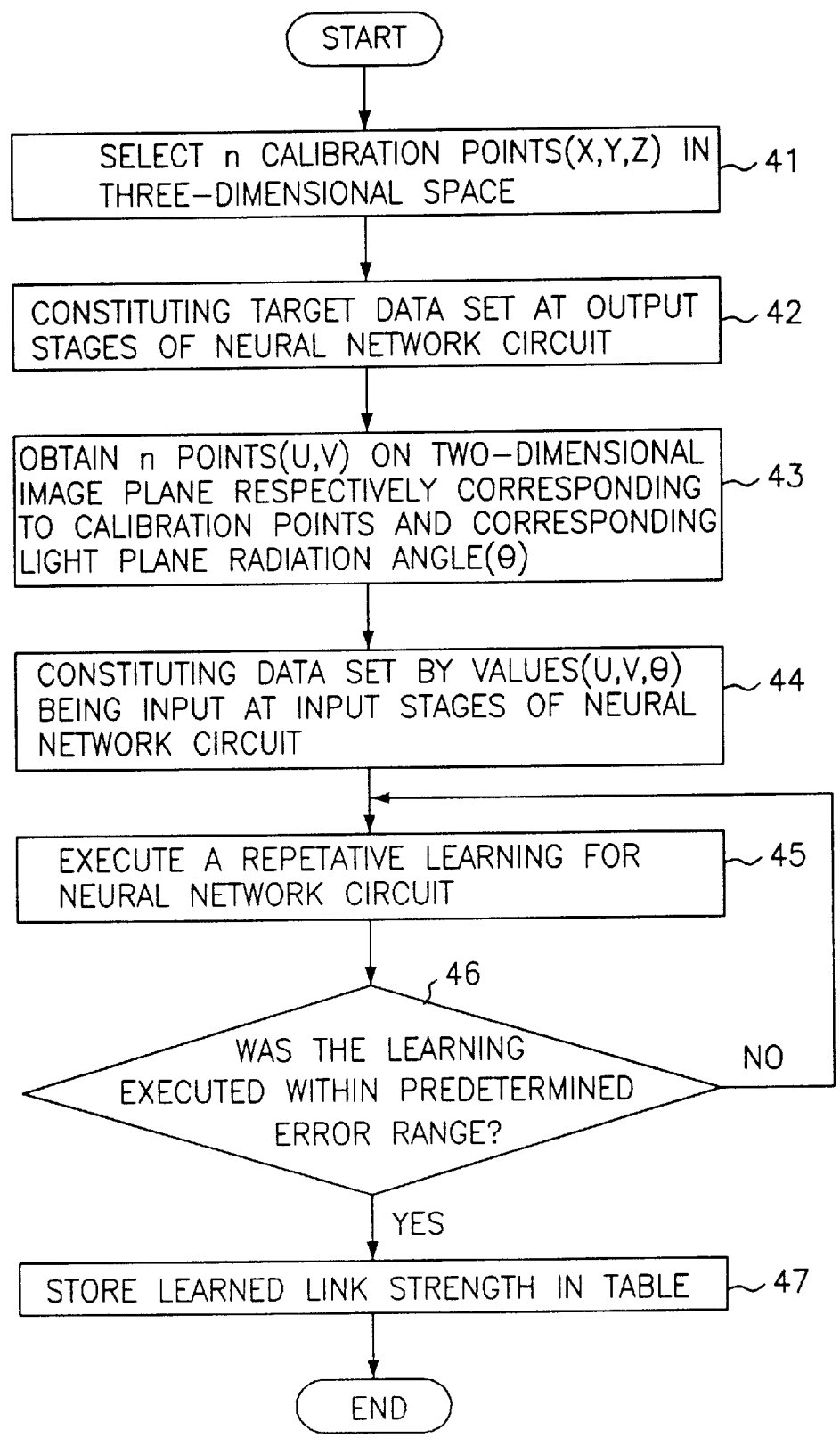
FIG. 4 is a flow chart illustrating the learning procedure for distortion calibration in accordance with the present invention.

FIG. 4 is a flow chart illustrating the learning procedure for distortion calibration in accordance with the present invention. FIG. 4 shows the procedure of learning the mapping relationship between three dimensional and two dimensional images to each other by use of a neural network circuit using image coordinate values respectively corresponding to three dimensional coordinate values (x,y,z) of each control point and corresponding light plane illumination angle values as a learning set (U,V,θ). In accordance with the method of the present invention, n control point (X,Y,Z) in a three dimensional coordinate space are selected (Step 41), as shown in FIG. 4. Thereafter, a target data set is constituted, which will be output at output stages of the neural network circuit (Step 42). n points (U,V) on a two dimensional image plane respectively corresponding to calibration points and corresponding light plane illumination angles θ are obtained (Step 43).

A data set is then constituted by the data (u,v,θ) which will be input at input stage of the neural network (Step 44). After constituting the data set, a repetitive learning is executed for the neural network (Step 45). Learning may be performed by various algorithms, the most popular of which is the "back-propagation" method. A determination is made about whether the leaning is executed below a predetermined error range (Step 46). When the learning is determined to be executed within the predetermined error range, the learned connecting strength is stored in a table (Step 47). If the learning is not executed below the predetermined error range, then the procedure is repeatedly executed from step 45.

That is, the connecting strength between neurons corresponding to the mapping relationship is derived by repeating the learning such that it is executed within the desired error range. The derived link strength value is kept by the table.

A more accurate learning can be executed by selecting a larger number of control point or corresponding points at various distances. In this case, however, an increased processing time is required. Accordingly, an appropriate number of control point is selected. The learning is repeatedly executed by selecting control point respectively for desired distances. Link strengths respectively derived for the distances are kept by the table.

Now, the procedure of calibrating 3-D data as the second procedure will be described in conjunction with FIG. 5.

Figure 5:
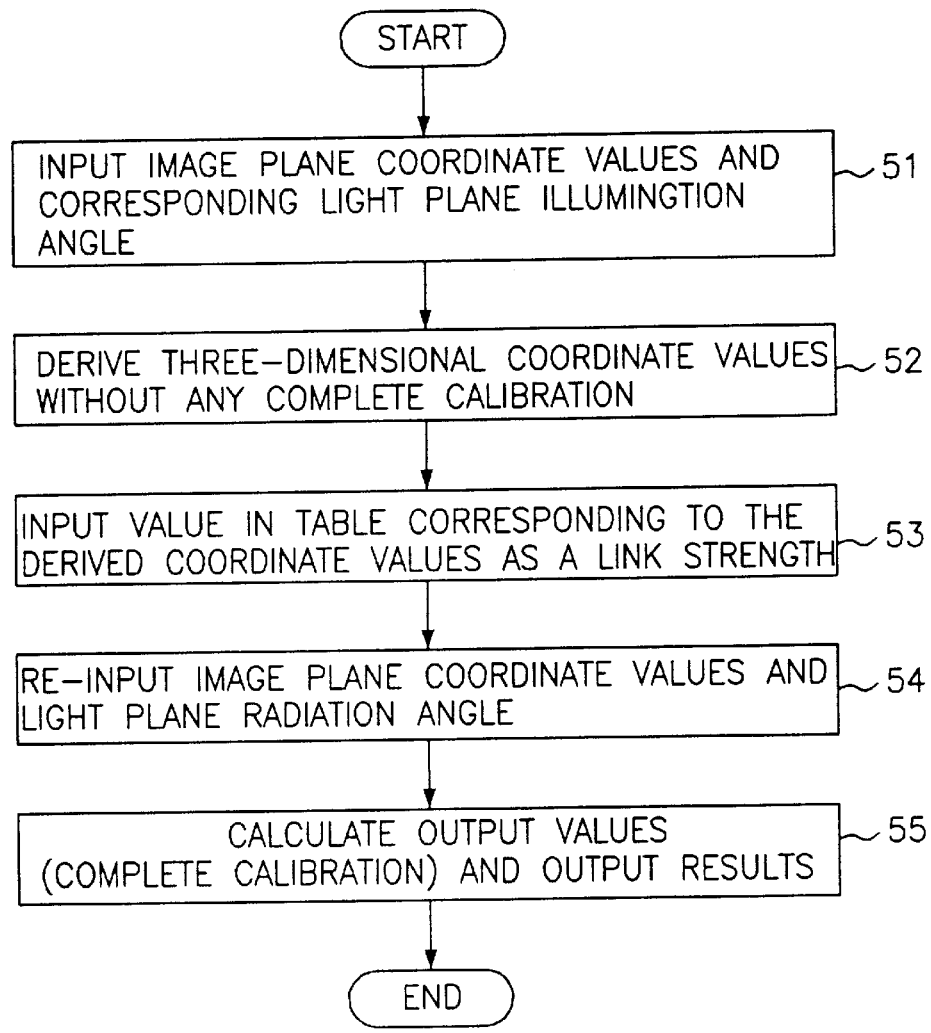
FIG. 5 is a flow chart illustrating the distortion calibrating and three dimensional range data acquisition procedure in accordance with the present invention.

FIG. 5 is a flow chart illustrating the distortion calibrating procedure in accordance with the present invention. In accordance with the calibrating procedure, 3-D data is obtained from an input image plane coordinate and light plane illumination angle (Step 51). The camera image is back-projected without any calibration, thereby deriving image information u,v and θ. Based on the image information, a rough distance is derived (Step 52). Thereafter, a value, stored in the table, corresponding to the derived distance is input as a link strength for the neural network circuit (Step 53). Data (U,V, θ), which includes coordinate values of an optional image and a light plane radiation angle thereof, is input to the neural network circuit (Step 54). As a result, the neural network circuit outputs accurate three-dimensional coordinate values (X,Y,Z) involving no distortion error (Step 55). Accordingly, it is possible to derive calibrated, accurate values.

In other words, the angle θ corresponds to the values (X,Y,Z) of a point Pw, along with the values of U and V. This can be expressed by the following equation:

$$Pw(X,Y,Z)=F(U,V,\theta)$$

Where a point Q indicated with values (i,j,θ) on the camera image plane is back-projected in the form of a point indicated with values (X,Y,Z) in the three-dimensional space, the point in the three-dimensional space can be derived by the mapping function F. Accordingly, an image distortion can be calibrated using the mapping function F. The accuracy in the calibration is determined by the accuracy of the mapping function.

As high limit of predetermined learning error is decreased, accuracy of three dimensional data obtained by back-projection is increased.

Figure 6:
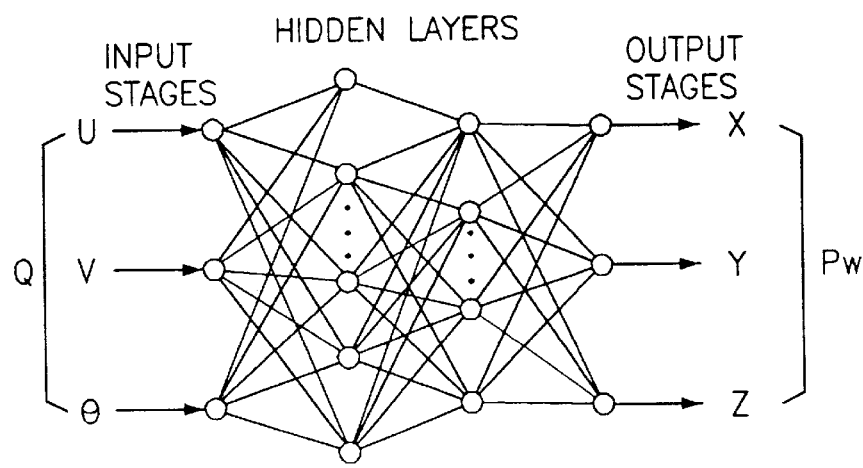
FIG. 6 is a circuit diagram illustrating a neural network for calibrating camera distortion and calculating three dimensional range data in accordance with an embodiment of the present invention.

FIG. 6 is a circuit diagram illustrating a neural network circuit for calibrating an image distortion in accordance with an embodiment of the present invention. The illustrated neural network circuit is a multilayer perception neural network circuit using a back propagation learning algorithm.

As shown in FIG. 6, the neural network circuit includes three neurons at both input and output stages thereof and hidden layers. The circuit receives values (U,V,θ) respectively associated with n control point on the image plane at its input stages. The circuit also receives values (X,Y,Z) in the three-dimensional space respectively corresponding to the n control point at its output stages. Based on the received values, the circuit executes a learning in accordance with many different algorithms, the popular of which is the back propagation method. In other words, a link strength $W_{ij}$ between neurons mapping the input and output values is derived.

As apparent from the above description, in accordance with the present invention, the mapping relationship between a control point in the three-dimensional space and a control point projected onto the two-dimensional image plane at a desired distance and illumination angle is derived by the neural network circuit. Values indicative of the mapping relationship are stored in a table. Using the table, the calibration for an image distortion can be achieved. Accordingly, the present invention provides an advantage that the image distortion can be easily and efficiently calibrated irrespective of variations in the environment, the kind of camera and other parameters.

The method of the present invention can be also applied to various technical fields. For example, the method of the present invention can be effectively applied to cameras mounted to robot vision system units adapted for the three-dimensional object recognition or distance measurement.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An image distortion method for preventing an image in a three-dimensional space from being distorted upon being projected onto image plane of a camera, comprising the steps of:
   (a) deriving a mapping function between each of n number of real test points in the three-dimensional space and corresponding each of n number of camera image test points projected onto a two dimensional image plane wherein said each of the real points is designated by real three-dimensional coordinate values and said each of the camera image points represented by using two-dimensional coordinate values and by using an radiation angle (θ) between a light plane toward each real test point and a base (or reference) line, n being a positive integer;
   (b) converting the derived mapping function into link strength data of a neural network circuit by using a repetitive learning procedure and storing the link strength data in a table; and
   (c) back-projecting the image obtained from the camera, thereby deriving a rough distance associated with the image, and loading the link strength data corresponding to the derived rough distance to the neural network circuit, to thereby generate calibrated three-dimensional image data.

2. The image distortion method in accordance with claim 1, wherein the step(a) comprises the steps of:
   (a-1) selecting said n number of the real test points in the three-dimensional coordinate space, and then constituting the three-dimensional coordinate values (X,Y,Z) of said each of the real test points as a target data set at output stages of the neural network circuit;
   (a-2) obtaining said n number of the camera image test points on the two-dimensional image plane, each corresponding to each of the real test points, and constituting two-dimensional image coordinate values (U,V) and the light plane radiational angle (θ) of said each of the camera image test points as a data set to be an input at input stages of the neural network circuit; and
   (a-3) executing the repetitive learning process for the neural network circuit until the learning is executed within a predetermined error range to thereby obtain the link strength data.

3. The image distortion calibrating method in accordance with claim 2, wherein the step (c) comprises the steps of:
   (c-1) projecting back the camera image obtained by receiving the coordinate values of the image on the two-dimensional image plane and the light plane radiation angles without any calibration, thereby deriving information about the image, and then deriving a rough distance based on the image information;
   (c-2) inputting a value in the table corresponding to the derived rough distance to the neural network circuit as a link strength data of the neural network circuit; and
   (c-3) inputting image coordinate values (U,V) and corresponding light plane radiation angle (θ) to the neural network circuit, thereby output corresponding accurate three-dimensional coordinate values (X,Y,Z) as the calibrated three-dimensional image data.

4. The image distortion calibrating method in accordance with claim 3, wherein the neutral network circuit includes a multilayer perception neural network circuit using many different learning algorithms which contain a back propagation learning algorithm.

* * * * *